March 5, 1929.   A. W. ANDREWS   1,704,525
FLOUR SIFTER
Filed Aug. 4, 1928
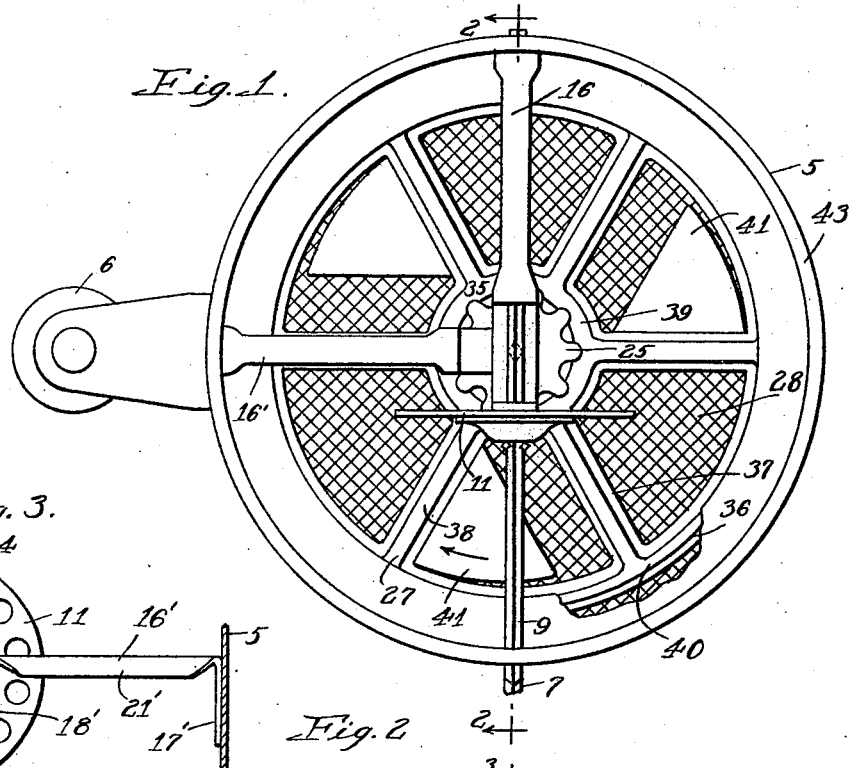
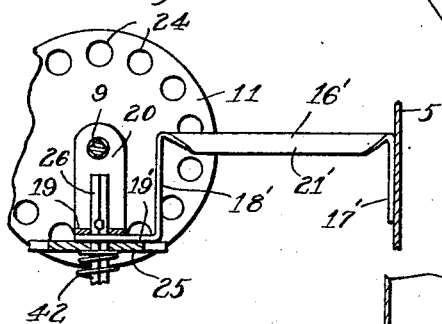
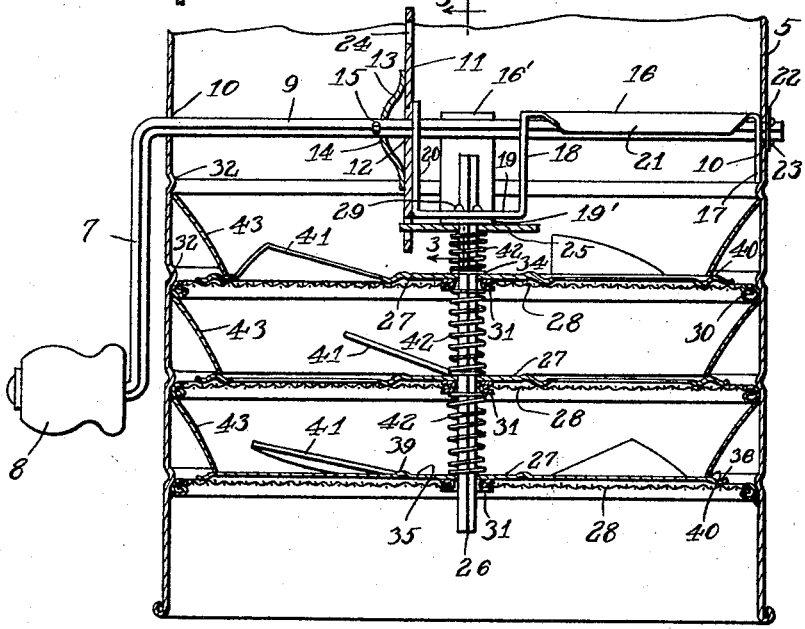
Inventor.
Alfred W. Andrews
By Wilson & McCanna
Attys.

Patented Mar. 5, 1929.

1,704,525

UNITED STATES PATENT OFFICE.

ALFRED W. ANDREWS, OF ROCKFORD, ILLINOIS, ASSIGNOR TO ADAM GSCHWINDT, OF ROCKFORD, ILLINOIS.

FLOUR SIFTER.

Application filed August 4, 1928. Serial No. 297,409.

This invention relates to an improved flour sifter for domestic use.

The principal object of my invention is to provide a flour sifter operating smoothly and easily and with such efficiency that flour and baking powder, or other materials put therein, are thoroughly sifted and admixed as well as thoroughly aerated in one handling thereof.

I attribute the efficient operation of the device to several novel features, to wit:—the provision of rotating agitators having struck up mixer or beater vanes which serve to mix the materials thoroughly as well as to beat the same sufficiently to cause aeration thereof; annular funnel-shaped deflectors cooperating with the rotating agitators to direct the materials onto the agitators and prevent the same from being crowded to the sides, and spring tensioners serving to hold the agitators in close but yielding contact with the screens and thus insure the desired efficient cooperation therebetween.

The invention embodies several other improvements going to make up a thoroughly practical device of sturdy design such as will not develop mechanical troubles in service, all of which, together with the foregoing, are fully described in the following specification in which reference is made to the accompanying drawing, wherein—

Figure 1 is a plan view of my improved flour sifter;

Fig. 2 is a central vertical section taken on the line 2—2 of Fig. 1 looking in the direction of the arrows; and Fig. 3 is a transverse sectional detail taken on the line 3—3 of Fig. 2 looking in the direction indicated.

The same reference numerals are applied to corresponding parts in the three views.

The sifter comprises the usual type of sheet metal container 5 open at the top and bottom and provided with a suitable handle 6 at one side thereof. A hand crank 7 equipped with a suitable knob 8 extends from the container to the right of the handle 6, preferably at right angles thereto. The crank 7, in accordance with my invention, is preferably formed from a single piece of wire, square in cross-section, having the shaft portion 9 thereof turning freely in round holes 10 provided at diametrically opposed points in the walls of the container. The squareness of the wire also does not interfere with the free turning of the knob 8 and is of advantage in facilitating the assembling of the drive sprocket 11 to turn with the shaft, the hole 12 in said sprocket being square and of a size snugly to receive the shaft. A stamped sheet metal hub 13 suitably spot-welded to the sprocket 11 at the rim thereof provides a bearing at 14 for the sprocket in spaced relation to the bearing 12 so that the sprocket is bound to remain rigid and run true. I prefer this construction to that of welding or otherwise suitably securing the sprocket to the shaft because of the fact that the sprocket is more certain of running true and will not be apt to become loose or wabbly as might otherwise be the case. Prongs struck out at 15 serve to hold the sprocket against movement in one direction. A bracket 16 formed suitably of sheet metal serves to hold the sprocket against movement in the other direction, the said bracket having one end 17 thereof bent at right angles and pierced to receive the shaft 9, the bent end being arranged to be soldered, welded, or otherwise suitably secured to the side wall of the container, and having the other end thereof bent downwardly as at 18, forwardly as at 19, and upwardly as at 20, portions 18 and 20 being pierced to receive the shaft 9 and the portion 20 bearing against the flat face of the sprocket 11 definitely to position the same and serve as a guide therefor in the operation thereof. The bracket 16 between the portions 17 and 18 has the lateral edges thereof bent down alongside the shaft 9, as at 21, to lend stiffness to the bracket. It will be evident that in assembling, the shaft 9 can be slipped through the parts described and that when the projecting end has a washer 22 slipped over the same and has prongs struck therefrom, as at 23, the crank assembly is completed and will always operate satisfactorily.

The sprocket 11 has a plurality of circumferentially spaced holes 24 punched therein to receive the teeth of a stamped sheet metal pinion 25 mounted on the upper end of a vertical shaft 26 which, like the shaft 9, is formed from a piece of square wire. The shaft 26, as will presently appear, transmits the drive to the series of rotary agitators 27 cooperating with the stationary screens or sieves 28. The portion 19 of the bracket 16 is pierced to receive the upper end of the shaft 26 and provide a bearing therefor permitting the shaft to turn with the pinion 25 and the agitators 27. The prongs 29 struck out from the sides of the shaft 26 serve to hold the same against downward displacement. Another bracket 16' disposed at right angles to the bracket 16 cooperates with the latter to form a rigid support for the upper end of the shaft 26, it being evident that the bracket 16' serves in the nature of a cross-brace assuming the lateral thrust imposed on the bracket 16 in the driving of the pinion 25 by the sprocket 11. If the bracket 16' were not provided a strain would be placed on the soldered or welded connection of the portion 17 of the bracket 16 with the side wall of the container. The bracket 16' has the one end thereof bent downwardly as at 17', and soldered, welded, or otherwise suitably secured to the side wall of the container 5, the other end of the bracket being bent downwardly as at 18' and forwardly as at 19', and the portion 19' being pierced to provide a bearing for the upper end of the shaft 26. The portion 19' of the bracket 16', it will be observed underlies the portion 19 of the bracket 16 and bears against the top of the pinion 25 serving, like the portion 20 of the bracket 16, as a guide for the pinion insuring that the same will run true in the operation thereof by the sprocket 11. The bracket 16' between the portions 17' and 18' has the lateral edges thereof bent downwardly, as indicated at 21', to reenforce the bracket and minimize the likelihood of its buckling.

The screens or sieves 28 have the raw edges thereof clinched in rolled sheet metal circular frames 30 and the centers thereof have openings in which grommets 31 are inserted, the said grommets permitting the insertion therethrough of the shaft 26 and the turning of the shaft with respect to the screens. The walls of the container 5 have annular beads formed therein, as indicated at 32. These beads provide annular shoulders within the container against the under side of which the frames 30 of the screens are arranged to engage when the screens are assembled in the container in a manner presently to be described, the frames being arranged to be soldered, or otherwise suitably secured, to the walls of the container to hold the same against downward displacement. Cooperating with the screens are the agitators 27 the center holes 34 in which are square to receive the square shaft 26 and thus provide for a driving connection therewith. The agitators 27 are struck from sheet metal to provide a center hub portion 35 and a concentric rim portion 36 connected by spokes 37 (see Fig. 1). Radial ribs 38 in the spokes 37 connect annular beads 39 and 40 formed in the hub 35 and rim 36, respectively, thus serving to lend considerable reenforcement to the agitators and minimize the likelihood of these parts being bent out of shape in the assembling thereof in the sifter. Each agitator is shown as having six spokes, although, of course, any number might be provided and I prefer to provide on one edge of every alternate spoke a mixing or beating vane 41 projecting from the plane of the agitator preferably at an acute angle with respect thereto. The inclination of the vanes 41 is to the rear as respects the direction of rotation of the agitators, the latter being arranged to turn in a clockwise direction as viewed in Fig. 1. The several agitators are assembled on the shaft 26 in such a way that the vanes 41 are disposed in staggered relationship; that is to say, the vanes 41 on the intermediate agitator are offset with respect to the vanes of the upper and lower agitators. The purpose in this is to make certain of thorough mixing as well as beating of the materials passed through the sifter. It will be evident that in the rotation of the agitators with respect to the screens the spokes 37 will sweep the screens and thereby help to work the material therethrough by thorough agitation thereof and that the vanes 41 will, at the same time, function to thoroughly admix whatever constituents are in the material as, for example, flour and baking powder, or flour and sugar. The vanes 41 also beat the materials sufficiently to aerate the same so that the materials discharged from the sifter are found to be light and fluffy and of fine even texture. Coiled compression springs 42 are provided yieldingly to urge the agitators toward the screens to insure the efficient cooperation therebetween. All of the springs 42 are held in place on the shaft 26, the uppermost spring being disposed between the upper agitator and the under side of the pinion 25, whereas the other springs extend between the grommets 31 and the agitators therebeneath. The uppermost spring 42, therefore, cooperates with the portion 19' of the bracket 16' in maintaining the pinion 25 in proper intermeshing relation with the sprocket 11.

The operation of the agitators has a tendency to crowd the materials to the sides of the container. This, however, is not a characteristic peculiar to the present sifter inasmuch as it is well known that flour sifters generally have to be shaken or struck now and then in the course of the sifting to dislodge the flour from the sides where it tends to collect. To remedy this difficulty I provide funnel-shaped deflectors 43 above the agitators to concentrate the materials where they will be subjected to the full play of the agitators and the mixing or beating vanes provided thereon. The uppermost deflector 43 has the upper edge thereof located beneath one of the annular beads 32 and soldered, welded, or otherwise suitably secured to the wall of the container, the other deflectors having the upper edges thereof located beneath the frames 30 of the screens 28 and likewise soldered, welded, or otherwise suitably secured, to the walls of the container. The lower edges of the deflectors 43, it will be observed, are disposed directly over the annular beads 40 of the rims 36 of the agitators, thus preventing the flour or other material from getting behind the deflectors. It is found that the deflectors make it unnecessary to shake or strike the sifter during the operation thereof inasmuch as it is absolutely impossible for the material to crowd to the sides of the container beyond the range of the agitators.

The construction is obviously very simple and economical to manufacture. There is, furthermore, no difficulty in assembling; once the crank assembly and its bracing brackets 16 and 16′ are assembled in the container, the other parts can be dropped into place one after another and the deflectors 43 and screen frames 30 soldered or welded in place, the container being inverted in the latter part of the assembling operation to facilitate matters.

It is believed the foregoing description conveys a clear understanding of my invention and of the various features of advantage offered thereby. While reference has been made to various specific details of construction and arrangement it should be understood that these may be modified to a certain extent without sacrificing some of the more important advantages. The appended claims have accordingly been drawn with a view to covering all legitimate modifications, adaptations, and variations coming within the spirit and scope of the invention.

I claim:

1. In a flour sifter, the combination with a container having one or more sieves mounted therein and an agitator having parts sweeping the sieves and having the upper end of the shaft thereof equipped with a pinion for turning the same, of a shaft for operating the agitator passing diametrically through the container for support in the opposite side walls thereof and having a hand crank at one end outside the container and a sprocket inside the container meshing with the pinion on the agitator, a bracket secured at one end to the container wall and extending inwardly along the shaft, the inner end having the shaft passing therethrough and providing a depending portion having the upper end of the agitator shaft bearing therein for support, and a cross-brace for said bracket extending transversely with respect thereto between the depending portion of said bracket and the side wall of the container.

2. In a flour sifter, the combination with a container having one or more sieves mounted therein and an agitator having parts sweeping the sieves and having the upper end of the shaft thereof equipped with a pinion for turning the same, of a shaft for operating the agitator passing diametrically through the container for support in the opposite side walls thereof and having a hand crank at one end outside the container and a sprocket inside the container meshing with the pinion on the agitator, a bracket secured at one end to the container wall and extending inwardly along the shaft, the inner end having the shaft passing therethrough and providing a depending portion having the upper end of the agitator shaft bearing therein for support and another portion bearing against one side of the sprocket on the crank shaft to maintain the same in proper intermeshing relation with the pinion, and another bracket disposed in transverse relation to the last mentioned bracket secured at one end to the container wall and extending inwardly to the inner end of the other bracket, the inner end having the upper end of the agitator shaft bearing therein for support, and said inner end portion also bearing against one side of the pinion on the agitator shaft whereby to maintain the same in proper intermeshing relation with the sprocket on the crank shaft.

3. In a flour sifter, the combination with a container having one or more sieves mounted therein and an agitator having parts sweeping the sieves and having the upper end of the shaft thereof equipped with a pinion for turning the same, of a shaft for operating the agitator passing diametrically through the container for support in the opposite side walls thereof and having a hand crank at one end outside the container and a sprocket inside the container meshing with the pinion on the agitator, a bracket secured at one end to the container wall and extending inwardly parallel with the crank shaft, the inner end having the upper end of the agitator shaft bearing therein for support, and another bracket disposed in transverse relation to the inner end of the first bracket, the one end of said bracket being secured to the container wall and the inner end thereof also having the upper end of the agitator shaft bearing therein for support.

4. In a flour sifter, the combination with a container having one or more sieves mounted therein and an agitator having parts sweeping the sieves and having the upper end of the shaft thereof equipped with a pinion for turning the same, of a shaft for operating the agitator passing diametrically through the container for support in the opposite side walls thereof and having a hand crank at one end outside the container and a sprocket inside the container meshing with the pinion on the agitator, a bracket secured at one end to the container wall and extending inwardly parallel with the crank shaft, the inner end having the upper end of the agitator shaft bearing therein for support, and another bracket disposed in transverse relation to the inner end of the first bracket, the one end of said bracket being secured to the container wall and the inner end thereof also having the upper end of the agitator shaft bearing therein for support, one of said brackets having a portion bearing against the side of the sprocket on the crank shaft to maintain the same in proper intermeshing relation with the pinion on the agitator shaft, and one of the brackets also having a portion bearing against one side of the pinion on the agitator shaft to maintain the same in proper intermeshing relation with the sprocket on the crank shaft.

5. In a device as set forth in claim 4 wherein the crank shaft is square in cross-section and has a shoulder thereon spaced with respect to the portion of the first bracket bearing against the side of the sprocket, the said sprocket comprising a stamped sheet metal blank having a center hole to fit the shaft, and a dished hub member of stamped sheet metal also having the rim portion thereof secured to the aforesaid blank, at least one of said center holes being square to provide a driving connection between the sprocket and the shaft, and the said center holes being sufficiently spaced by reason of the construction described to provide ample bearing support for the sprocket on the shaft.

6. In a device as set forth in claim 4 wherein the crank shaft has a shoulder thereon spaced from the portion of the first mentioned bracket bearing against the side of the sprocket, the said sprocket comprising a blank struck from sheet metal and having a center hole provided therein, and a stamped sheet metal hub member of dished form also having a center hole therein and having the rim portion thereof secured to the aforesaid blank, said shaft passing through said center holes and having a driving connection with said sprocket, and said center holes being sufficiently spaced by reason of the construction described to provide ample bearing support for the sprocket on the shaft.

7. A sifter of the character described comprising, in combination, a container having a sifting screen, an agitator cooperating therewith having the upper end of the shaft thereof equipped with a pinion, a shaft passing diametrically through the container above the agitator having a hand crank at one end outside the container and a sprocket inside the container meshing with the pinion, a bracket formed of a strip of sheet metal secured at one end to the container wall and bent to extend inwardly along the crank shaft and thence downwardly to provide bearing support for the upper end of the agitator shaft and thence upwardly and having a bearing on the crank shaft alongside the sprocket thereon, and another bracket formed of a strip of sheet metal secured at one end to the container wall and bent to extend inwardly transversely with respect to the inner end of the first bracket and thence downwardly to the downwardly bent portion of the first bracket so as to cooperate with the latter in providing bearing support for the upper end of the agitator shaft, the downwardly bent portion of the second bracket being disposed preferably alongside the pinion on the agitator shaft.

8. In a sifter of the character described, the combination with a container having one or more sieves mounted therein, an agitator having parts sweeping the sieves and having the upper end of the shaft thereof equipped with a pinion for turning the same, and a shaft for operating the agitator passing diametrically through the container for support in the opposite side walls thereof and having a hand crank at one end outside the container, of a sprocket meshing with the pinion for transmitting the drive from the crank shaft to the agitator shaft, said sprocket comprising a blank struck from sheet metal and having a center hole provided therein to receive the shaft, and a stamped sheet metal hub of dished form having a center hole provided therein concentric with but spaced from the other center hole to receive the shaft and having the rim portion thereof secured to the aforesaid blank, said sprocket having a driving connection with said shaft, and means for holding said sprocket against movement with respect to the shaft endwise of the latter.

9. A device as set forth in claim 8 wherein the shaft in square in cross-section and wherein at least one of the center holes referred to are of corresponding form to provide the driving connection between the shaft and the sprocket without the medium of other means or without the necessity of welding or otherwise securing the sprocket to the shaft.

10. In a sifter of the character described, the combination with a container having one or more sieves mounted therein and an agitator having parts sweeping the sieves and having the upper end of the shaft thereof equipped with a pinion for turning the same, of a shaft for operating the agitator passing diametrically through the container for bearing support in the opposite side walls thereof, said shaft being formed of a single piece of wire square in cross-section and having one end thereof bent to provide a hand crank outside the container, a sprocket having a square center hole for reception of said shaft and to provide a driving connection therebetween without the medium of additional means or without necessitating the fastening of said sprocket to the shaft by welding or otherwise, said sprocket being disposed in intermeshing relation with said pinion, and means for holding said sprocket against movement endwise of the shaft out of operative relation to the pinion.

11. A sifter of the character described comprising in combination, a container having one or more sieves therein, an agitator having parts sweeping the sieves and having means for turning the same, and one or more deflectors at the side walls of said container for preventing accumulation of material otherwise crowded to the side walls in the operation of the agitator.

12. A sifter of the character described comprising in combination, a container having one or more sieves therein, an agitator having parts sweeping the sieves and having means for turning the same, and one or more substantially funnel-shaped deflectors disposed above the sieves about the sides of the container with the smaller ends thereof disposed over the parts of the agitator sweeping the sieves.

13. A sifter of the character described comprising in combination, a container having one or more sieves therein, an agitator having parts sweeping the sieves and having means for turning the same, and means on the walls of said container serving to prevent the accumulation of material in the space beyond the range of operation of the sweeping agitator parts.

14. A sifter of the character described comprising in combination, a container having one or more sieves therein, an agitator having parts sweeping the sieves and having means for turning the same, and funnel-shaped sheet metal rings disposed above the sieves with the smaller ends thereof lowermost and just within the range of operation of the sweeping parts of the agitator, the larger ends of said rings being secured to the side walls of said container.

15. A sifter of the character described comprising in combination, a container having one or more sieves therein, an agitator having parts sweeping the sieves and having means for turning the same, and one or more substantially funnel-shaped deflectors disposed above the sieves about the sides of the container with the smaller ends thereof disposed over the parts of the agitator sweeping the sieves, the said agitator parts having upwardly projecting mixing or beating vanes provided thereon operating in the plane of the deflectors nearest the smaller ends thereof to which point the material is concentrated in operation.

16. In a sifter, the combination of a container having one or more sieves mounted therein, and an agitator having portions all disposed substantially in one plane close to the surface of the sieve to sweep the same and having mixing or beating vanes projecting upwardly from the plane of the sweeping portions at an acute angle, the inclination of said vanes being to the rear as respects the direction of rotation of the agitator.

17. In a sifter, the combination of a container having one or more sieves mounted therein, and an agitator stamped from sheet metal to provide a flat hub portion and a flat concentric rim portion joined by spokes all disposed in substantially one plane for operation close to the surface of the sieve to sweep the same in the rotation thereof, certain of the spokes having vanes provided thereon projecting upwardly at an acute angle to the aforesaid plane, the inclination of said vanes being to the rear as respects the direction of rotation of the agitator.

18. A device as set forth in claim 17 wherein the sheet metal agitator has reenforcing radial ribs struck in the spokes and reenforcing annular beads struck in the hub and rim portions joining the radial ribs whereby to minimize danger of the agitator being bent in assembling or in operation.

19. In a sifter of the character described, the combination of a container having two or more screens mounted therein in substantially parallel relation, two or more agitators disposed on top of said screens and arranged to be rotated to sweep the same, a shaft extending through the screens and interconnecting the agitators for operation in unison, means for rotating said shaft, and coiled compression springs mounted on the shaft and bearing against the agitators yieldingly to urge the same toward the screens for efficient operation.

In witness of the foregoing I affix my signature.

ALFRED W. ANDREWS.